(12) United States Patent
Arnold et al.

(10) Patent No.: US 7,996,823 B2
(45) Date of Patent: Aug. 9, 2011

(54) MECHANISM TO PROVIDE DEBUGGING AND OPTIMIZATION IN POLICY AND KNOWLEDGE CONTROLLED DISTRIBUTED COMPUTING SYSTEMS, THROUGH THE USE OF TAGGED POLICIES AND KNOWLEDGE REPRESENTATION ELEMENTS

(75) Inventors: William C. Arnold, Mahopac, NY (US); David M. Chess, Mohegan Lake, NY (US); David M. Levine, New York, NY (US); Edward Snible, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 1104 days.

(21) Appl. No.: 11/756,420

(22) Filed: May 31, 2007

(65) Prior Publication Data

US 2008/0301630 A1 Dec. 4, 2008

(51) Int. Cl.
*G06F 9/44* (2006.01)

(52) U.S. Cl. ...................................................... 717/128

(58) Field of Classification Search .......... 717/127–128; 706/47; 707/694
See application file for complete search history.

(56) References Cited

U.S. PATENT DOCUMENTS

| | | | |
|---|---|---|---|
| 5,193,185 A * | 3/1993 | Lanter ................................... 1/1 |
| 5,398,304 A * | 3/1995 | Bauman et al. ................. 706/49 |
| 6,466,932 B1 | 10/2002 | Dennis et al. |
| 6,889,231 B1 * | 5/2005 | Souder et al. ......................... 1/1 |
| 2002/0147726 A1 * | 10/2002 | Yehia et al. .................... 707/101 |
| 2004/0243692 A1 | 12/2004 | Arnold et al. |
| 2005/0060568 A1 | 5/2005 | Beresnevichiene et al. |
| 2005/0246686 A1 * | 11/2005 | Seshadri et al. .............. 717/117 |
| 2006/0161444 A1 * | 7/2006 | Lubrecht et al. .................. 705/1 |
| 2008/0273224 A1 * | 11/2008 | Maulsby et al. ............. 358/1.15 |

* cited by examiner

*Primary Examiner* — Anna Deng

(74) *Attorney, Agent, or Firm* — Scully, Scott, Murphy & Presser, P.C.; Stephen C. Kaufman, Esq.

(57) ABSTRACT

A mechanism to provide debugging and optimization in policy and knowledge controlled distributed computing system through the use of tagged policies is provided. An aspect of the mechanism tags one or more policies, for instance, at their creation time, execution time and/or at any other time an event that affects the policies occur. Decisions made according to policy execution or evaluation may be traced using the tags.

14 Claims, 4 Drawing Sheets

MECHANISM TO PROVIDE DEBUGGING AND OPTIMIZATION IN POLICY AND KNOWLEDGE CONTROLLED DISTRIBUTED COMPUTING SYSTEMS, THROUGH THE USE OF TAGGED POLICIES AND KNOWLEDGE REPRESENTATION ELEMENTS

FIELD OF THE INVENTION

The present disclosure generally relates to policy management, optimization and debugging.

BACKGROUND OF THE INVENTION

Policies generally refer to rules that are enforced in any number of situations. A business, for instance, may have certain policies affecting its employees, equipments, services, etc. Computer systems and infrastructures may include policies relating to its components, users, usage, etc. Telecommunications systems may have rules such as which calls to accept, reject, reroute, etc. Other examples abound. Enterprises, corporations, small entities and the like generally implement a vast number of different policies and rules that fit their needs and requirements, for instance, using software tools that can automatically monitor and implement those policies. However, even with those sophisticated software tools that automate policy evaluations, it is inevitable that some evaluations result in erroneous decisions being made that violate the existing policies. Errors may occur, for example, due to loosely coupled policy statements that are created by different users and entities, conflicting policy statements existing at the same time, and the like. Once the policy decisions are rendered and enforced erroneously, there is no easy way of knowing how the errors occurred. Accordingly, it is desirable to have a system and method to trace back and debug evaluation steps that rendered a policy decision.

BRIEF SUMMARY OF THE INVENTION

A method and system for providing debugging and optimization in policy and knowledge controlled distributed computing system is provided. The method in one aspect may comprise generating descriptive information associated with one or more steps of one or more of policy creation, transformation and deployment; associating a unique identifying tag with the descriptive information; and storing the descriptive information and the unique identifying tag, wherein said one or more steps of one or more of policy creation, transformation and deployment can be debugged or optimized or combination thereof using the descriptive information and the unique identifying tag.

A system for providing debugging and optimization in policy and knowledge controlled distributed computing system, in one aspect, may comprise a policy creation module operable to create one or more policies and associated annotations; a policy repository operable to store the one or more policies and associated annotations; a knowledge repository operable to store at least one or more attributes associated with enforcing the one or more policies; and a policy enforcement module operable to retrieve information from the knowledge repository and the policy repository and enforce one or more policies in response to requests for policies.

A program storage device readable by machine, tangibly embodying a program of instructions executable by the machine to perform the above-described methods is also provided.

Further features as well as the structure and operation of various embodiments are described in detail below with reference to the accompanying drawings. In the drawings, like reference numbers indicate identical or functionally similar elements.

DETAILED DESCRIPTION

Figure 1:
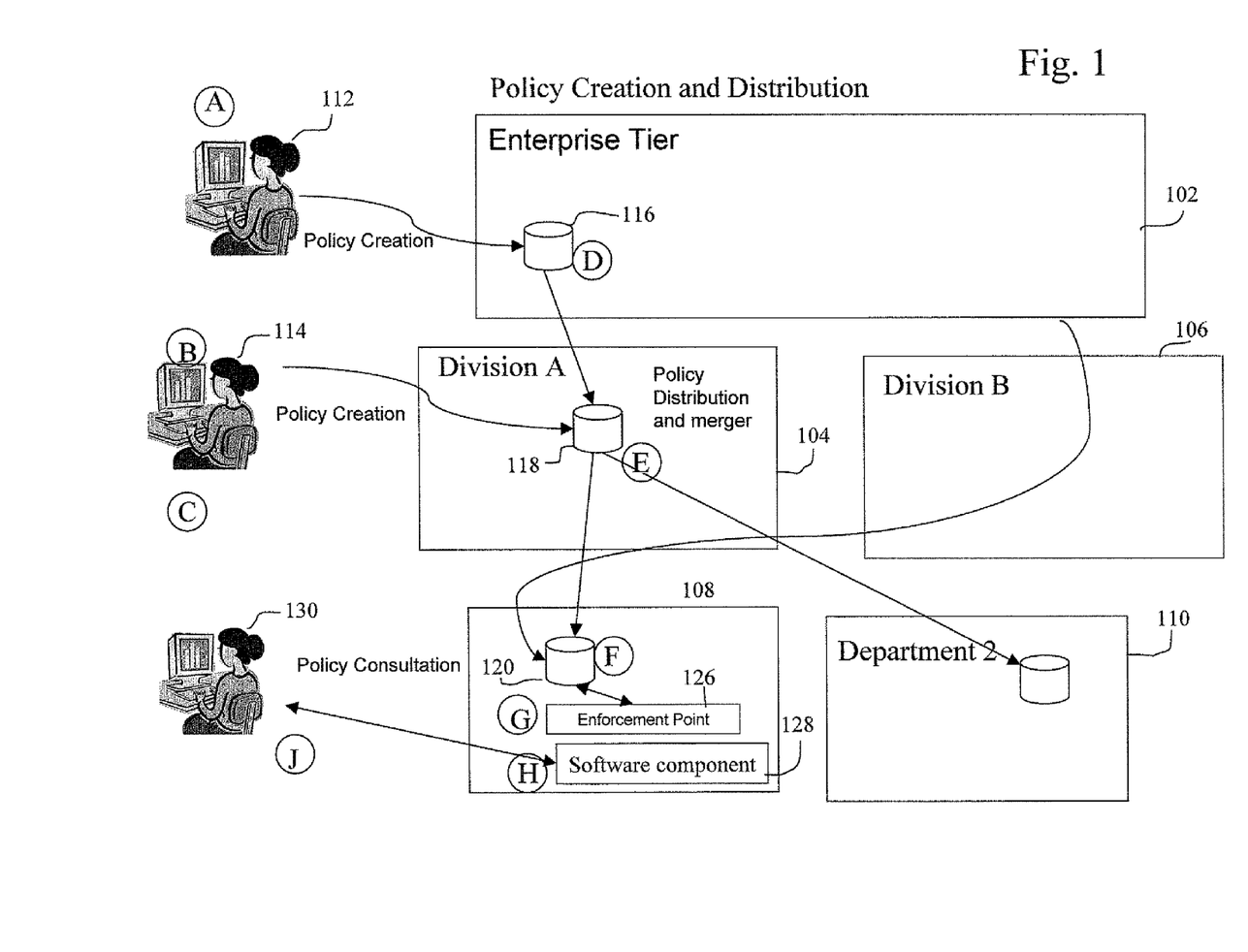
FIG. 1 illustrates one aspect of policy creation and distribution.

FIG. 1 illustrates one aspect of policy creation and distribution. Policy may be created at multiple levels 102, 104, 106, 108, 110 in the infrastructure, stored, merged and distributed for use by enforcement components. For example, separate policy creators 112, 114 use tools to create policies at points A, B (e.g., automatic) and C (e.g., manual). These policy expressions may be stored in servers, D 116, E 118, and F 120. The policy expressions are transformed, for instance, through a transformation point which may perform a merger, for example, by automated tooling, or manually, at points E and F. The transformation points E 118 and F 120 may, for example, include a software tool or engine or any other module that performs these functions. A transformation point may also be a human mediated process. For example, an operator may manually merge policies and create a new copy of the merged rules. The merged policy expressions are used by enforcement point G 126, which may take one or more requests from other software components at H 128. Software components 128 may include but are not limited to any components that need one or more policy decision results. The results of those requests permit or deny various actions in the software components. Should a user J 130, disagree with the action of the policy system, the user may request the cause of the decision from the enforcement point G 126.

In an exemplary embodiment of the present disclosure, each policy input is a declarative, modular expression, with clear rules for combining, so they can be combined mechanically. For clarity, the present disclosure provides some sample policies first as prose, then as rough predicate logic rules, for a simple policy enforcement point using policy rule sets. The present disclosure shows the merged policies, current evaluation method, evaluation and ability to backtrack to cause of one or more problems. The present disclosure also provides details of the policy language and a system and method for tracing and/or feedback mechanism. The system and method for tracing and providing feedback mechanism may utilize any known or will be known policy evaluation machinery.

A policy engine is a software component which can be used to evaluate expressions of policy. In one embodiment, a policy engine is considered to be a policy evaluation component which includes a policy evaluator (such as a predicate logic RETE engine described in C. L. Forgy, "Rete: A fast algorithm for the many pattern/many object pattern match problem," Artificial Intelligence, vol. 19, pp. 17-37, 1982) along with stored knowledge in the form of predicates, and external situated sensors. The policy engine evaluates a policy expression by combining the policy statements with the current set of predicates, and possibly values derived from external sensors)

In an exemplary embodiment, the policy engine evaluates all rules, and if the rule criteria are not met, the policy engine denies the request, unless a rule explicitly sets to allow the request. If a rule evaluates to neither a deny decision nor an allow decision, the policy engine in one embodiment allows the request to happen.

The following lists examples of policies expressed in natural language, for instance, which may be used in a corporate-wide environment:

1. Only jobs less then 100 pages can be printed between 8:00 am and 10:00 am on public printers.
2. Only Jobs less than 100 pages can be printed between 4:00 pm and 5:30 pm on public printers.
3. Any job submitted by a manager will print at any time.
4. Only department members can print on a private printer.

The following are examples of corresponding policies formulated in predicate language:

1. ((greater_than(time(0800),$time)) and (less_than(time(1000),$time) and (greater_than(page_count,100)))→Deny
2. ((greater_than(time(1600),$time)) and (less_than(time(1730),$time) and (greater_than(page_count,100)) )→Deny
3. ((manager($job_submitter))→Allow
4. ((Private($target_printer) and (not(equal(department($job_submitter),department_owning($target_printer)))→Deny The following lists examples of policies expressed in natural language, for instance, which may be used in a divisional-wide environment, for example, within a corporate environment:

1. Jobs can only be submitted to color printers by full time staff and primary contractors
2. Bulk printers can be used to print any sized job at any time The following are examples of corresponding policies formulated in predicate language:

1. (color($target_printer) and (not((full_time_staff($job_submitter) or (primary_contractor($job_submitter))→deny
2. Bulk_printer($target_printer)→Allow The following lists examples of predicate language policy expressions merged from the above corporate-wide and division-wide policies:

1. ((greater_than(time(0800),$time)) and (less_than(time(1000),$time) and (greater_than(page_count,100)) )→Deny
2. ((greater_than(time(1600),$time)) and (less_than(time(1730),$time) and (greater_than(page_count,100)))→Deny
3. ((manager($job_submitter))→Allow
4. ((Private($target_printer) and (not(equal(department($job_submitter),department_owning($target_printer)))→Deny
5. (color($target_printer) and (not((full_time_staff($job_submitter) or (primary_contractor($job_submitter))→deny
6. Bulk_printer($target_printer)→Allow Table 1 is an example of a knowledge base at enforcement point.

TABLE 1

| Resource | Attribute | Value |
| --- | --- | --- |
| Department47 | Memberlist | John_Smith07, Jacob_Williams15, Sharon Brent01, Carol_Allen78, Walter_Per_Orenson01, Darryl_Brown78, Cindy_Liu98, |
| Printer_047 | Private | True |
| Printer_047 | Color | True |
| Printer_047 | Department_owning | Department47 |
| Cluster_printer21 | Color | false |
| Cluster_printer21 | Public | True |
| Sharon_Brent01 | Manager | True |
| Bulk07 | Bulk | True |
| Bulk07 | Color | True |

An example of a request made to policy enforcement point (PEP) may include:

Permission_to_print((target_printer,Bulk07),Submitter(Carol_Allen),page_count(10)

PEP takes the request, the current knowledge base for example as shown in Table 1, and the policy rules shown in examples above, calculates and merges the items such as the current time and date, and evaluates the request.

Table 2 shows merged policy. The current values from Table 1, which match the rule being evaluated and the input values, which arrive with the event are merged for evaluation. This provides a local fact set to be used for the current policy evaluation episode.

TABLE 2

| Resource | Attribute | Value |
| --- | --- | --- |
| Department47 | Memberlist | John_Smith07, Jacob_Williams15, Sharon Brent01, Carol_Allen78, Walter_Per_Orenson01, Darryl_Brown78, Cindy_Liu98, |
| Printer_047 | Private | True |
| Printer_047 | Color | True |
| Printer_047 | Department_owning | Department47 |
| Sharon_Brent01 | Manager | True |
| Carol_Allen78 | Contractor | True |
| Bulk07 | Bulk | True |
| Bulk07 | Color | True |
| Printer_047 | Department_owning | Department47 |

(target_printer,Bulk07)
Submitter(Carol_Allen78,
page_count(10))
Target_printer, Bulk)
Target_printer(color)

The policy engine evaluates rules, knowledge and outputs conclusion. For instance, the policy engine gathers the following facts from the policy request and knowledge data:
 target_printer is Bulk07;
 submitter is Carol_Allen78;
 page_count is 10;
 target_printer is Bulk;
 target_printer is color.

The policy engine evaluates the following policy rules, which are selected because they involve the parameters in the above request:

1. ((greater_than(time(0800),$time)) and (less_than(time(1000),$time) and greater_than(page_count, 100))→Deny
2. ((greater_than(time(1600),$time)) and (less_than(time(1730),$time) and greater_than(page_count, 100))→Deny 3. ((manager($job_submitter))→Allow
4. ((Private($target_printer) and (not(equal(department ($job_submitter),department_owning($target_printer)))→Deny
5. (color($target_printer) and (not((full_time_staff($job_submitter) or (primary_contractor($job_submitter))→Deny
6. Bulk_printer($target_printer)→Allow The following results are obtained from evaluating the above rules:
1. Doesn't fire (page count<100)
2. Doesn't fire (pagecount<100)
3. Doesn't fire, submitter is not manager
4. Fires, sets deny
5. Fires, sets allow As a result of this evaluation the job is permitted. However, Carol has violated company policy by being able to print a color job, as a contractor, because nobody thought there would be bulk color printers.

In one embodiment, in order to know why the contractor was allowed to send a job to a color printer, the policy evaluates what contributed to the decision. In one embodiment, the policy engine tags all the contributing information at every step along the way. A brute force version, for example, tags everything, at every step, with nested history.

Examples of brute force tagging are listed below:
1. ((greater_than(time(0800),$time)) and (less_than(time (1000),$time) and (greater_than(page_count,100)))→Deny)
TAG: CREATED BY J. SMITH CHQ 3/12/05
2. ((greater_than(time(1600),$time)) and (less_than(time (1730),$time) and (greater_than(page_count,100)))→Deny
TAG: CREATED BY J. SMITH CHQ 3/12/05
3. ((manager($job_submitter))→Allow
TAG: 0003 CREATED BY C. JONES. IT DEPT 1/18/04
4. ((Private($target_printer) and (not(equal(department ($job_submitter),department_owning($target_printer)))→Deny
TAG: CREATED BY J LIU, IT DEPT. 3/4/06

When these policies with tags attached are distributed, for example, automatically or manually, to the divisional IT Servers, each gets further tagged as follows. Tagging describes the origin and the distribution path of the rule components.

1. ((greater_than(time(0800),$time)) and (less_than(time (1000),$time) and (greater_than(page_count,100)))→Deny)
TAG: Distributed to Divisional Server 17 From (TAG: CREATED BY J. SMITH CHQ 3/12/05) at 10:18 pm on 5/5/06 by command from J. LIU)
2. ((greater_than(time(1600),$time)) and (less_than(time (1730),$time) and (greater_than(page_count,100)))→Deny (TAG: Distributed to Divisional Server 17 from (CREATED BY J. SMITH CHQ 3/12/05) at 10:18 pm on 5/5/06 by command from J. LIU)
3. ((manager($job_submitter))→Allow (TAG: CREATED BY C. JONES. IT DEPT 5/5/06 Stored on Divisional Server 17 by (C. JONES IT DEPT 5/10/06)
4. ((Private($target_printer) and (not(equal(department ($job_submitter),department_owning($target_printer)))→Deny
(TAG: CREATED BY J LIU, IT DEPT. 3/15/06, Stored on Divisional Server 17 by C. JONES IT DEPT 5/10/06 by C. JONES IT DEPT)

In one embodiment, the rule sets are tagged as they are loaded into the PEP:
(RULE set for printer permissions, Loaded by request from PEP at 3:17 AM on 6/22/06 during PEP setup)

The rule sets may be loaded by a policy enforcement point when it needs to evaluate a policy, or by some other component, when it invokes the PEP, implicitly or explicitly.

The request is also tagged as follows:
Permission_to_print((target_printer,Bulk07),Submitter (Carol_Allen),page_count(10)) TAG: Request from printer utility running on C.ALLENLAPTOP at 6/23/06 08:47

When the policy engine begins to process the policy request the facts which were loaded may also be tagged. Per existing policy evaluation systems, each rule or policy expression execution may be tagged if desired. The policy engine then may return the entire chain of information with the response.

In another embodiment, each rule or policy may include one or more reference pointers to the saved tags. The tags may be stored in a server, or saved on a system where the rule was created or on a system where the event that needs tagging occurred or anywhere else as desired. These tags can be self-describing, or can follow a prescribed scheme to permit the underlying data to be retrieved. Stored tags may be reused as many times as needed. For example, policy expression X's tag can be reused repeatedly as many times as the policy expression X is used, as long as X remains unchanged and keeps its identity.

In one embodiment, tags can refer to other tags. In another embodiment, tags can refer to other tags recursively. For example, TAG 19781 may refer to TAG1982 merged with TAG19811 attached to PEP via TAG 18979, where each tag refers to a unique, more complete explanation of the events. A tag may, as part of its content use other tags. For example, there may be a Tag1982 which is used to refer to a longer tag that is a complete explanation, e.g., "This policy element created by J J Smith on 12/17/06, using the xemacs policy tool." Another tag, TAG2765 may read "TAG1982, merged with (No job greater than 1700 MB shall be printed." Tag levels can be mixed, for instance, as in "POLICY TAG1891 edited by C. LIU on 3/4/03." This for example makes it clear that there is no requirement that all items in a tag be directed through other tags. The method may include tags, or more verbose non-tagged explanations, as desired, and not change the behavior of the invention.

Tags describing the contributions to a policy evaluation may be used, for instance, to debug behavior. For example, the tags may link the executable, rule and/or policy set to the source code, and/or its history. Tags also may help determine sources and/or causes of conflicting rules, explain the system's behavior. When the policies produce acceptable, but sub-optimal behavior, tags may provide feedback to the policy creators, for instance, to aid in improving behavior.

Figure 2:
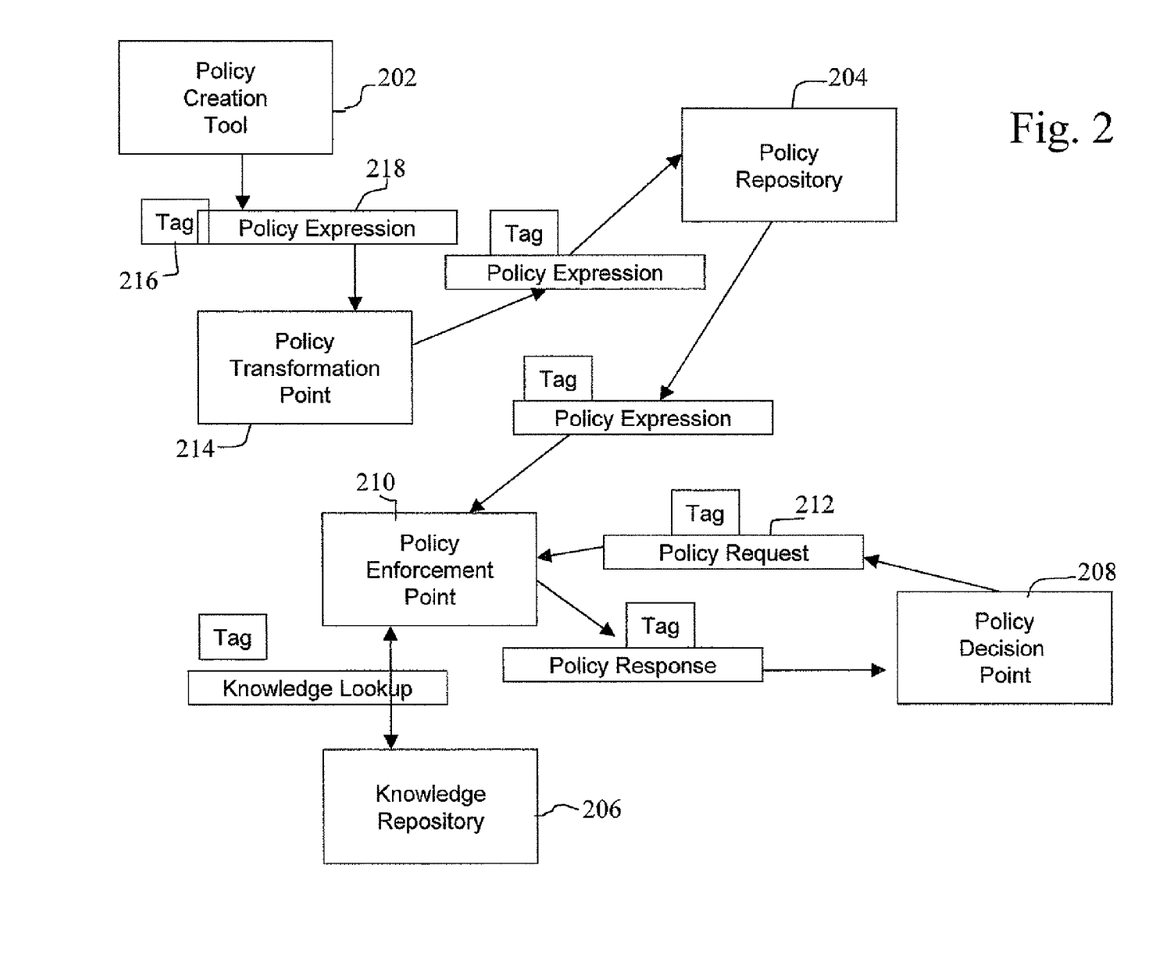
FIG. 2 is a block diagram illustrating tagged policy evaluation system in one embodiment of the present disclosure.

FIG. 2 is a block diagram illustrating tagged policy evaluation system in one embodiment of the present disclosure. Policy may include a set of interpretable statements. In one embodiment, a policy may include any set of one or more declarative (for instance, not procedural) statements that may be situated in a policy enforcement point, and evaluated as part of the process of controlling the behavior of a software or hardware element. A policy expression may include references to external representation of knowledge. A policy expression may be situated in a policy enforcement or evaluation point through the use of mappings between externalized predicates and information provided by the policy enforcement or evaluation point. Policy expressions may be nested, and may include sets of policy expression used under different circumstances. Evaluated policy expressions can yield zero or more expressions of action, for example, including permissions, or denials to take actions, or a set of same, or a set of actions that may be undertaken, by the requester, or other infrastructure elements in the system.

A policy creator and/or editor 202 may include any tool, which permits the creation of, or modification of policy expressions. For instance, policy creators may be as simple as plain text editing tools, or as complex as graphical editing environments with complex validation and simulation tools. Policy creation tool 202 permits creating and modifying policy expressions. Policy creation tools 202 may take the form of editor-like tools.

A policy repository 204 in one embodiment may include a component, which can accept one or more policy expressions, store the policy expressions and accept requests to retrieve them. A policy repository 204 may be a database of policies, with tools for annotating the policies, and searching for desired policies.

Knowledge in one embodiment may include an encoding of a factual statement in a form that can be used as part of the evaluation of one or more policy expressions. Knowledge may be typically encoded in a form related to the policy expressions. Examples of knowledge include predicates used in rule-based systems, based on first order predicate logic, generally expressed as one or more predicates. Another example may be knowledge in temporal logic based policy systems where the knowledge is generally expressed as temporally situated expressions of logic. Yet another example may be knowledge in a reasoning system, which uses probabilistic knowledge, where predicate style representation may be combined with a probability assigned to the knowledge, for instance, for use in reasoning.

In one embodiment, knowledge may include marked up information that can be used by software or hardware component, which evaluates policy expressions, during the process of evaluating a policy request. Knowledge may include but is not limited to such information as the current time, facts passed in with a policy enforcement request, and facts stored in knowledge bases within a large scale distributed policy infrastructure. Examples may include:
 IsMemberOfDepartment (Dept567, Lucinda_Lee01)
 FromTime (1800, BulkPrinterPermited(Printer147)
 IsInOffice (JoeSmith, (Probability(89%))

A knowledge repository 206 may include any computing element, which retains and provides knowledge, for instance, described above and makes the information available for use by the policy system. Knowledge repositories 206 may be either standalone components, integrated into policy components, or integrated into other components in the computing infrastructure. Knowledge repository 206 may be as simple as internal data structure, or as complex as a database, and may cache local copies of facts, from a remote location.

A policy decision point (PDP) 208 may include any portion of hardware or software component, which desires to engage in policy mediated behavior. In one embodiment, the PDP 208 issues requests to a policy enforcement point (PEP) 210 through a policy request 212. A PDP 208 may be integrated into software or hardware, or provided through a separate component, with arbitrary degrees of isolation. Likewise, the PDP 208 and PEP 210 may be integrated or separated by an arbitrary amount of infrastructure.

A policy request 212 may be a request from a software or hardware component to a policy enforcement point. In one embodiment, a policy request 212 may include references (direct or indirect or otherwise) to zero or more expressions of knowledge, and zero or more policy expressions, which will cause an evaluation of the request, possibly in combination with knowledge and policy information from other portions of the infrastructure, and yield one or more indications of action from the policy enforcement point 210.

A policy enforcement point (PEP) 210 may include a point in a computing system where policy requests are combined with policy expressions, and knowledge to determine if a given action should be performed, or to select zero or more possible actions from a set of actions encoded in one or more policy expression statements. A PEP 210 may be a standalone component or may be implemented as part of another component within a computing system. PEPs 210 may contain zero or more internal knowledge bases, and/or may use interprocess or intermachine protocols to gather knowledge from one or more external knowledge bases. A PEP 210 may contain policy within itself, or may use interprocess or intermachine, or local file system style operations to fetch policy expressions for evaluation, or it may evaluate requests, which include the requests, policy expressions and knowledge needed to evaluate the request. A policy transformation may include any process, computational, or human directed, which takes one or more policy expressions as an input and creates one or more new policy expressions. Examples of policy transformations may include, but are not limited to:
 merge transforms, which combine one or more policy expressions into a new policy expression;
 selection transforms, which select one or more policy expressions from a policy expression to form a new policy expression;
 substitution (template) transforms, which take a policy expression in a template form, and adapt it for use in a specific situation, but substituting local terms for generic terms in a template.

A policy transform point (PTP) 214 may include any point in the policy infrastructure where one or more transforms may be applied to one or more policy statements. Any transformation will create a new policy expression, and this new policy expression will require a new tag, describing the origin of the initial policy expression, and the transform(s) applied.

A PTP 214 may be implemented using a manual, automated, or semi-automated process. PTPs 214 may be combined with other portions of the policy infrastructure, or implemented as stand alone services.

A tag 216 or a policy tracking tag may include an expression, which may be attached to a policy expression 218, policy request 212, knowledge element, or policy evaluation trace. A tag 216 may provide an indication of how the policy expression has been manipulated within the system. It may include either structured, unstructured information, or a combination of the two. A tag 216 may include nested sets of tags, each describing a different manipulation performed on a policy expression. Tags 216 may be expressed directly, through simple inclusion, or indirectly, as a pointer to the stored information contained in the tag. In one embodiment, tags embedded directly are referred to as direct tags, and tags which are stored in part, or whole outside the tagged element as indirect tags.

A policy evaluation trace may include a set of one or more tags created by a PEP 210 during the process of evaluating a policy. It generally may include one or more tags of the policy element being evaluated, one or more tags of the policy request being evaluated, one or more tags of any knowledge used in the evaluation of the policy, and one or more tags created by the PEP 210, for instance, during intermediate steps of processing the policy.

A policy violation may occur when the system acts in ways not desired by the creators of the collective policies governing the system. Policy violations may occur due to inconsistencies in policy expressions, incorrect evaluation of policies, and incomplete propagation of knowledge between components.

Figure 3:
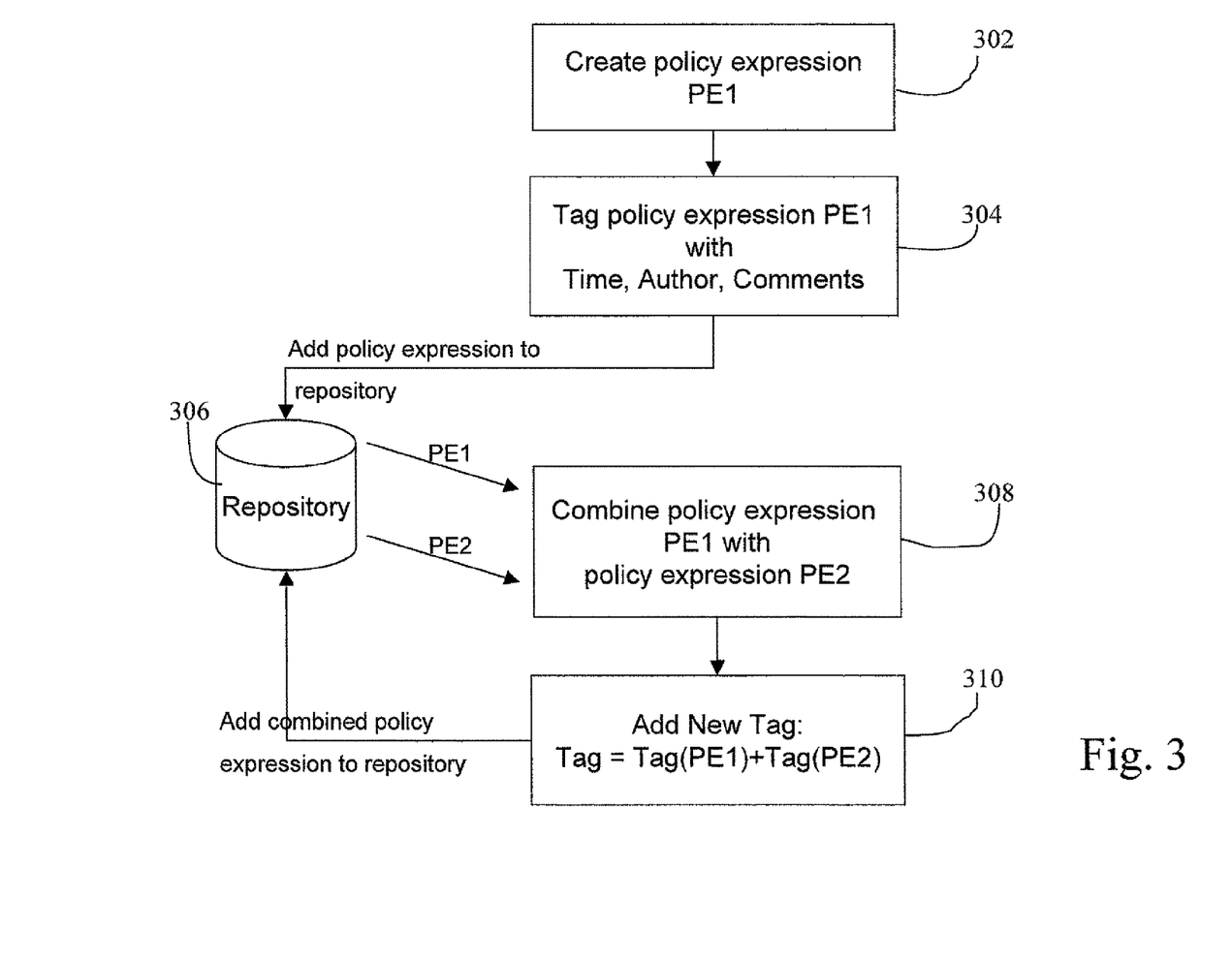
FIG. 3 is a flow diagram illustrating a method of creating tagged policies.

FIG. 3 is a diagram showing policy creation and tagging of the present disclosure in one embodiment. At 302, an operator using a tool or an automatic process creates a policy expression PE1. At 304, policy expression is tagged with information such as time, author and comments, if any. The tagging may be done by an operator using a tool or automatically. The policy expression is added to a repository 306. At 308, various policies created and stored in the repository 306 may be combined. The combined policy then gets a new tag at 310 and is stored in the repository 306.

Figure 4:
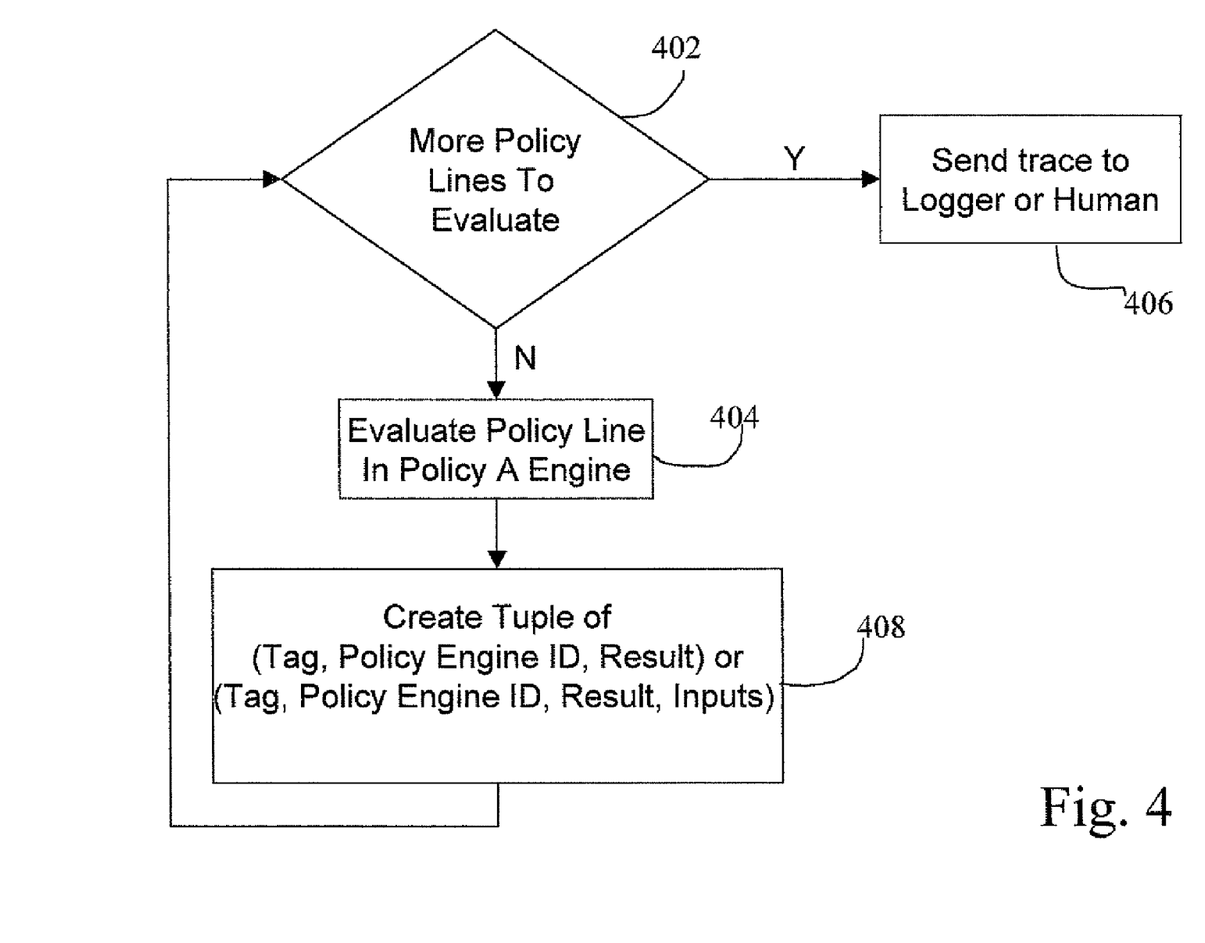
FIG. 4 is a flow diagram illustrating a method of using one or more tagged policies to trace one or more policy evaluations.

FIG. 4 illustrates creating of tags of the present disclosure during policy evaluation. At 402, if there are policy lines to evaluate, a policy evaluator evaluates the policy line at 404. Otherwise, at 406, trace is sent to a logger for logging and/or to an operator. At 408, results of policy evaluation are generated along with tag information. For example, a tuple of (tag, policy engine ID, result) or (tag, policy engine ID, result, inputs), or any other such output information from policy evaluation may be generated.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for providing debugging and optimization in policy and knowledge controlled distributed computing system, comprising:
generating descriptive information associated with one or more steps of one or more of policy creation, transformation and deployment, the description information including at least origin and distribution path of rule components in a policy, information associated with loading of the policy and information associated with a request for the policy;
associating a unique identifying tag with the descriptive information;
tracing the unique identifying tag with the descriptive information to identify behavior in the one or more steps of one or more of policy creation, transformation and deployment, or combinations thereof that contributes to policy violations;
using the unique identifying tag and the descriptive information to identify problems associated with an execution of one or more of policy enforcement, deployment or transformation activity, or combinations thereof; and
storing the descriptive information and the unique identifying tag,
wherein said one or more steps of one or more of policy creation, transformation and deployment can be debugged or optimized or combination thereof using the descriptive information and the unique identifying tag.

2. The method of claim 1, wherein the descriptive information includes expressions of policies, type of transformation being performed, or other information identifying nature of one or more activities occurring in the one or more steps of one or more of policy creation, transformation and deployment, or combinations thereof.

3. The method of claim 1, further including:
tracing the unique identifying tag with the descriptive information to identify policy-violating source.

4. The method of claim 1, further including:
using the unique identifying tag and the descriptive information to trace an execution of one or more of policy enforcement, deployment or transformation activity, or combinations thereof.

5. The method of claim 1, further including:
using the unique identifying tag and the descriptive information to set breakpoints during an execution of one or more of policy enforcement, deployment or transformation activity, or combinations thereof.

6. The method of claim 1, further including:
generating a policy evaluation trace including the descriptive information associated with one or more policy elements being evaluated and one or more policy requests being evaluated.

7. A system for providing debugging and optimization in policy and knowledge controlled distributed computing system, comprising:
a policy creation module operable to generate annotations associated with one or more policies creation, transformation and deployment, the associated annotations including at least origin and distribution path of rule components in a policy, information associated with loading of the policy and information associated with a request for the policy;
a policy repository operable to store the one or more policies, the associated annotations, and a unique identifying tag associated with the associated annotations;
a knowledge repository operable to store at least one or more attributes associated with enforcing the one or more policies;
a policy enforcement module operable to retrieve information from the knowledge repository and the policy repository and enforce the one or more policies in response to requests for policies, trace the unique identifying tag associated with the associated annotations to identify behavior in the one or more policies creation, transformation and deployment, or combinations thereof that contributes to policy violations, and use the unique identifying tag associated with the associated annotations to identify problems associated with an execution of one or more of policy enforcement, deployment or transformation activity, or combinations thereof;

wherein the associated annotations and the information associated with loading of the policy and the information associated with a request for the policy can be used to debug policy evaluation results.

8. The system of claim 7, further including:
a policy transformation nodule operable to transform the one or more policies, generate one or more annotations associated with transforming the one or more policies, and store the transformed one or more policies in the policy repository with the one or more annotations.

9. The system of claim 7, wherein the policy enforcement module is further operable to annotate one or more policies during enforcing of the requests for policies.

10. A program storage device readable by machine, tangibly embodying a program of instructions executable by the machine to perform a method for providing debugging and optimization in policy and knowledge controlled distributed computing system, comprising:
generating descriptive information associated with one or more steps of one or more of policy creation, transformation and deployment, the description information including at least origin and distribution path of rule components in a policy, information associated with loading of the policy and information associated with a request for the policy;
associating a unique identifying tag with the descriptive information;
tracing the unique identifying tag with the descriptive information to identify behavior in the one or more steps of one or more of policy creation, transformation and deployment, or combinations thereof that contributes to policy violations;
using the unique identifying tag and the descriptive information to identify problems associated with an execution of one or more of policy enforcement, deployment or transformation activity, or combinations thereof; and
storing the descriptive information and the unique identifying tag,
wherein said one or more steps of one or more of policy creation, transformation and deployment can be debugged or optimized or combination thereof using the descriptive information and the unique identifying tag.

11. The program storage device of claim 10, wherein the descriptive information includes expressions of policies, type of transformation being performed, or other information identifying nature of one or more activities occurring in the one or more steps of one or more of policy creation, transformation and deployment, or combinations thereof.

12. The program storage device of claim 10, further including:
tracing the unique identifying tag with the descriptive information to identify policy-violating source.

13. The program storage device of claim 10, further including:
using the unique identifying tag and the descriptive information to trace an execution of one or more of policy enforcement, deployment or transformation activity, or combinations thereof.

14. The program storage device of claim 10, further including:
using the unique identifying tag and the descriptive information to set breakpoints during an execution of one or more of policy enforcement, deployment or transformation activity, or combinations thereof.

* * * * *